United States Patent [19]

Lostumo et al.

[11] Patent Number: 5,896,236
[45] Date of Patent: Apr. 20, 1999

[54] METALLIZED PLASTIC FILM MIRROR FOR PROJECTION TELEVISION RECEIVER

[75] Inventors: Arthur J. Lostumo, Franklin Park; Steven J. Pulchinski, Rolling Meadows, both of Ill.

[73] Assignee: Zenith Electronics Corporation, Glenview, Ill.

[21] Appl. No.: 08/795,685

[22] Filed: Feb. 5, 1997

[51] Int. Cl.⁶ .................................................. G02B 5/08
[52] U.S. Cl. .................. 359/847; 359/900; 353/98; 348/782
[58] Field of Search .................. 359/847, 846, 359/900; 348/203, 205, 782, 783, 784, 756, 779; 353/98, 99; 248/466, 467

[56] References Cited

U.S. PATENT DOCUMENTS

| | | | |
|---|---|---|---|
| 3,552,835 | 1/1971 | Benzies | 359/847 |
| 3,687,524 | 8/1972 | Martinez | 359/847 |
| 3,733,116 | 5/1973 | Hutchinson | 359/847 |
| 3,757,479 | 9/1973 | Martinez | 359/847 |
| 3,880,500 | 4/1975 | Kojabashian | 359/847 |
| 3,936,159 | 2/1976 | Pavenick | 359/847 |
| 3,973,834 | 8/1976 | Penn et al. | 359/847 |
| 5,422,704 | 6/1995 | Sego | 355/53 |
| 5,680,262 | 10/1997 | Soliday et al. | 359/847 |

FOREIGN PATENT DOCUMENTS

| | | | |
|---|---|---|---|
| 991898 | 6/1976 | Canada | 359/847 |
| 2491816 | 4/1982 | France | 359/847 |
| 44-9516 | 5/1969 | Japan | 359/847 |
| 1295157 | 11/1972 | United Kingdom | 359/847 |
| 1324078 | 7/1973 | United Kingdom | 359/847 |
| 1366408 | 9/1974 | United Kingdom | 359/847 |

*Primary Examiner*—Cassandra Spyrou
*Assistant Examiner*—John Juba, Jr.

[57] ABSTRACT

A mirror for a rear projection television receiver is formed of stretched and heat-shrunk metallized plastic film. A U-shaped aluminum frame is formed out of roll stock and cut and bent into the desired shape. The frame has a flat front surface that includes a smooth raised inner edge in contact with the metallized plastic film, which is adhesively secured to the flat front surface of the frame. A rigid backing is secured in close proximity to the metallized plastic film by having its edges sandwiched by the U-shaped frame. The frame has support brackets affixed thereto.

8 Claims, 2 Drawing Sheets

METALLIZED PLASTIC FILM MIRROR FOR PROJECTION TELEVISION RECEIVER

BACKGROUND OF THE INVENTION AND PRIOR ART

This invention relates generally to rear projection television receivers and particularly to the relatively large mirrors used in such projection receivers.

Rear projection type television receivers are very popular due to the large display screens that are available for the enjoyment of the user without necessitating special installations and/or large viewing areas. In such receivers, three color cathode ray tubes (red, green and blue) project an image onto a mirror, with the image being reflected (and magnified) onto a display screen that may comprise a fresnel lens arrangement. The large mirrors, on the order of 40×30 inches, are not only expensive, but heavy.

Recently, some rear projection television receiver mirrors have been fabricated of metallized plastic film that is tightly stretched and secured to a relatively light-weight aluminum frame. The technique utilizes a trapezoidal shape, U-shaped frame that is secured to the cabinet (at an appropriate angle) by brackets at its corners, or by welding. A rigid backing, in the form of about a one-half inch thick sheet of styrofoam is secured in the frame very close to the metallized plastic film. The metallized plastic film is stretched, wrapped around the frame and secured to both the backing and to the back of the frame by an adhesive. The excess metallized plastic film is trimmed and the assembly is subjected to heat for a short time to cause the stretched metallized plastic film to shrink somewhat. Suitable mounting brackets are affixed to the frame. The result is a very flat, light-weight mirror. The main drawback of the mirror is that it is very labor intensive, since the adhesive is manually applied and the metallized plastic film is hand-wrapped about the frame, similar to gift wrapping a package. The resultant mirror often exhibits deformations due to wrinkling of the metallized plastic film unless the hand-wrapping is carefully done.

The present invention improves upon such prior art metallized plastic film mirrors by eliminating a majority of the hand operations, machine forming the frame from aluminum roll stock and reducing the likelihood of wrinkling of the metallized plastic film by supporting it at a smooth peripheral edge that is raised from the frame surface

OBJECTS OF THE INVENTION

A principal object of the invention is to provide a novel metallized plastic film mirror for a projection television receiver.

Another object of the invention is to provide a metallized plastic film mirror for a projection television receiver that is less costly to manufacture.

A further object of the invention is to provide a metallized plastic film mirror for a projection television receiver that is less likely to experience distortion due to wrinkling.

BRIEF DESCRIPTION OF THE DRAWING

These and other objects and advantages of the invention will be apparent upon reading the following description thereof in conjunction with the drawings, in which.

DESCRIPTION OF THE PREFERRED EMBODIMENT

Figure 1:
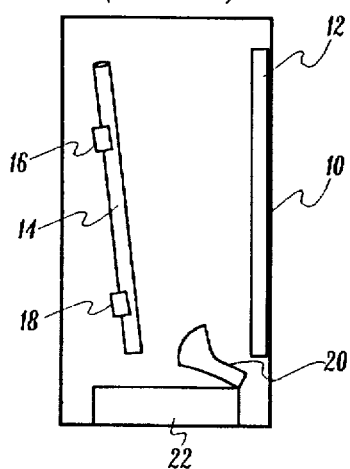
FIG. 1 is a simplified side sectional view of a prior art rear projection television receiver.
Figure 2:
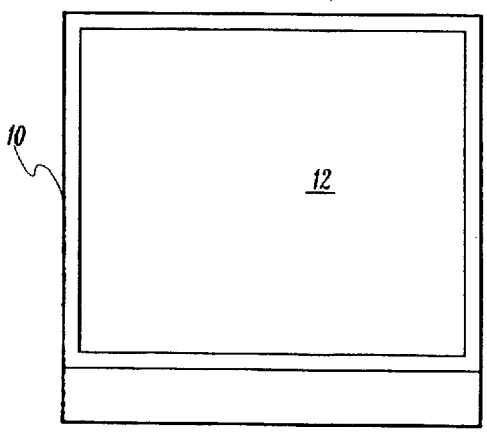
FIG. 2 is a front view of the receiver of FIG. 1.

Referring to FIG. 1, a typical prior art rear projection type television receiver includes a cabinet 10, a viewing screen 12, a projection mirror 14, positioned at an angle to the viewing screen 12, and a set of cathode ray tubes 20 (only one of which is shown) for projecting a televised image onto mirror 14. Mirror 14 includes a plurality of support brackets 16 and 18 for supporting it with the appropriate attitude within structure (not illustrated) in the television receiver. A chassis 22 supplies operating voltages and video information to cathode ray tubes 20 by well known means for generating a video display that is reflected by mirror 14 onto viewing screen 12. The viewing screen may take any of a well known number of forms, the fresnel type screen being acceptable. As is seen from FIGS. 1 and 2, the major advantage of rear projection type television receivers is the very favorable ratio of viewing screen area to depth of the television receiver cabinet.

As discussed above, the mirror 14 is large, very heavy and costly. The introduction of the light-weight metallized metallized plastic film mirror minimizes the above drawbacks of a conventional glass mirror. In accordance with the present invention, a method of manufacturing such a metallized plastic film mirror is presented that is not only less costly, but which achieves an improved product in terms of freedom from distortion and uniformity.

Figure 3:
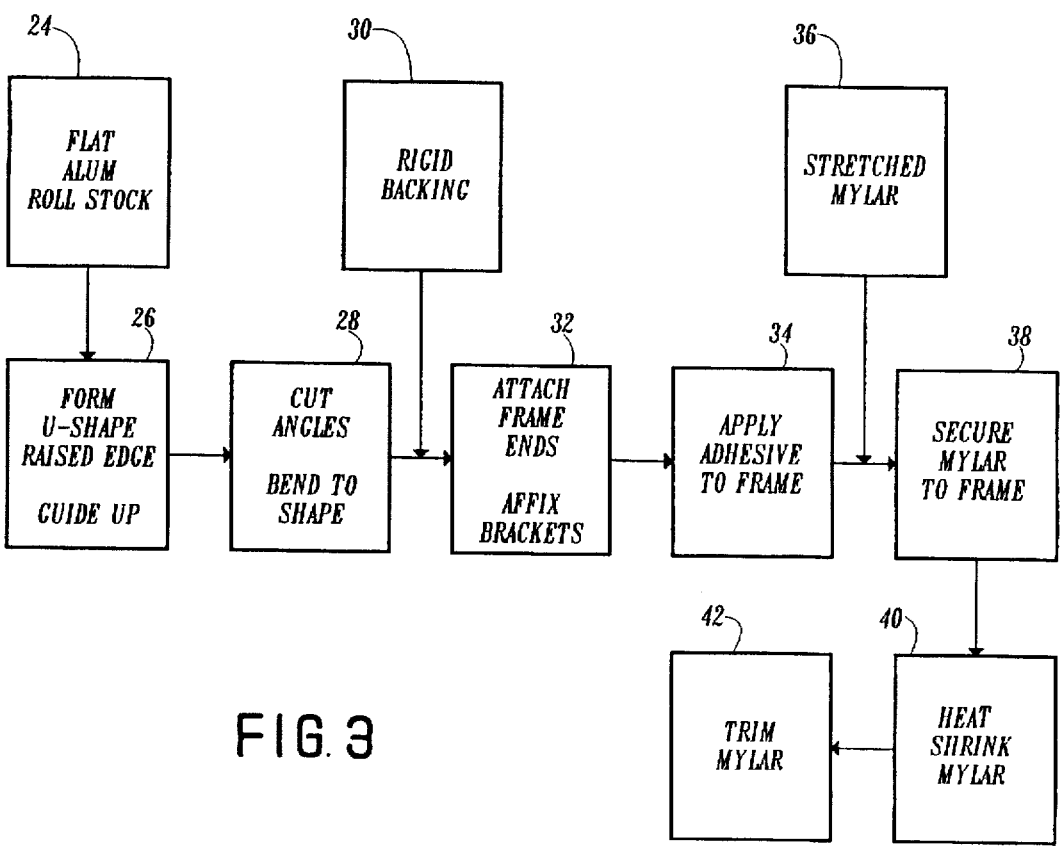
FIG. 3 is a simplified block diagram illustrating the method of the invention.
Figure 4:
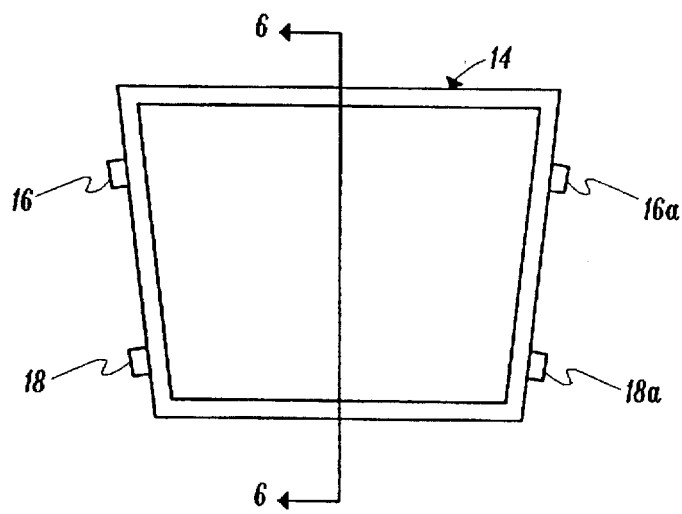
FIG. 4 is a plan view of a metallized plastic film mirror frame constructed in accordance with the invention.
Figure 5:
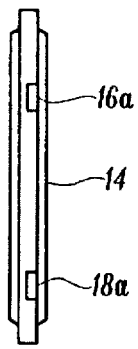
FIG. 5 is an end view of the frame of FIG. 4.

FIG. 3 represents a flow diagram of the inventive method. At block 24, flat aluminum roll stock (approximately 0.080 inches thick) is supplied to a block 26 where it is formed into a U-shape and given a smooth, raised edge on its front surface and an outward, angular guide lip on its rear edge. In block 28, the formed channel, after having angles of appropriate size cut out (at the desired lengths), is bent to the shape of the desired mirror for the size and configuration of the particular rear projection television receiver design. The open ends of the U-shaped frame are affixed to each other by any suitable means in block 32, a "TOX" attachment or attachment by combination rivet/screws being preferred. Prior to closure of the frame, a rigid styrofoam backing from block 30 is installed by sandwiching it between the channel walls of the U-shaped frame.

Figure 6:
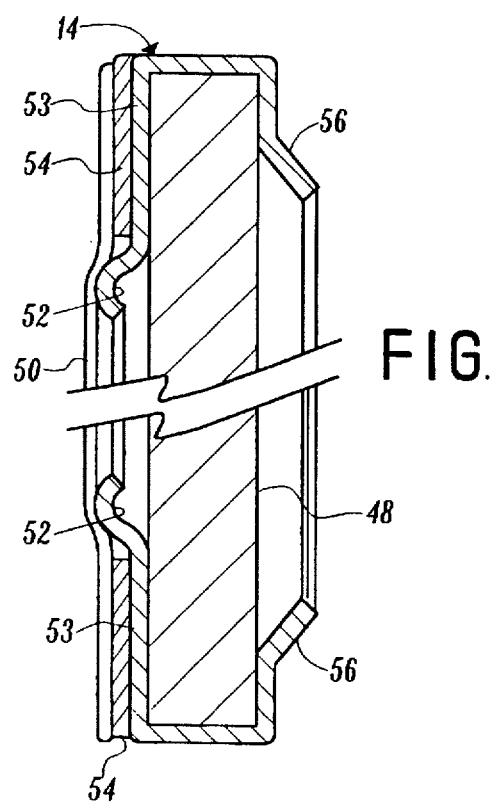
FIG. 6 is an enlarged partial cross sectional view of the frame of FIG. 4, with the metallized plastic film mirror assembled thereto, taken along the line 6—6 of FIG. 4.

The assembled frame, as best seen in FIG. 6, has a cross section that includes a smooth raised edge 52 that surrounds a flat front surface 53 of the frame 14. A guide lip 56, at the rear of the frame, is provided to assist in the installation of rigid backing 48 in the open channel of the U-shaped frame. The stretched metallized metallized plastic film 50 is preferably in full peripheral contact with smooth raised edge 53 and is secured to the flat front surface 53 of frame 14 by a suitable adhesive 54 that is applied to the flat front surface 53 of frame 14 but not to smooth raised edge 52. This is accomplished in block 34 of FIG. 3. As mentioned previously, smooth raised edge 52 assures that wrinkling (due to the gluing of the metallized plastic film to the frame) is precluded from adversely affecting the flat surface of the stretched metallized plastic film Reverting to FIG. 3, the metallized metallized plastic film is uniformly stretched in all directions in block 36 and placed in contact with the applied adhesive on flat front surface 53 of frame 14 in block 38. At this point, the film mirror may be considered complete, except for trimming of any excess metallized plastic film This is premised upon the stretching that is provided in block 36 being sufficient to completely remove all distortions from the surface of the metallized plastic film. In accordance with the preferred embodiment of the invention, a further step of heat shrinking the metallized plastic film is performed to assure that the resultant mirror is substantially free of any distortion. This is performed in block 40 and is followed by trimming of any excess metallized plastic film in block 42.

The material used in the preferred embodiment of the invention is a polyester film having a thickness of 0.001 inches. The stretching temperature is in the range of 300–350° F. with a heating time of from 5 to 10 seconds.

What has been described is a novel method and apparatus for manufacturing a metallized plastic film mirror for a projection type television receiver. It is recognized that those skilled in the art will perceive numerous modifications and changes to the described embodiment of the invention without departing from its true spirit and scope. The invention is to be limited only as defined in the claims.

What is claimed is:

1. A method of manufacturing a metallized plastic film mirror for a projection television receiver comprising:

forming a substantially U-shaped frame defining an inner area of desired shaped, the frame including a front surface having a smooth raised inner edge;

stretching a metallized plastic film over the smooth raised inner edge and into engagement with the front surface;

securing the metallized plastic film to the front surface, securing a rigid backing to the frame in close proximity to the stretched metallized plastic film;

the frame further including a front wall and a rear wall and the edges of the rigid backing being sandwiched between the front wall and the rear wall;

heat shrinking the metallized plastic film;

trimming the edges of the metallized plastic film;

wherein the frame comprises roll stock aluminum that is formed and bent into the desired shape and further comprising:

forming an outwardly angled guide lip around the inner edge of the rear wall of the frame; and installing the backing, with the aid of the guide lip, as the frame is being bent into shape.

2. The method of claim 1, further comprising:

joining the open ends of the frame before the securing step; and attaching one or more support brackets to the frame.

3. The method of claim 2, wherein the securing step for the metallized plastic film further comprises applying an adhesive to the front surface away from the smooth raised inner edge.

4. A method of manufacturing a metallized plastic film mirror for a projection television receiver comprising:

forming a frame defining an inner area of desired shape, from roll stock aluminum, the frame having a substantially U-shaped cross section including front and rear walls, with the front wall comprising a front surface with a smooth raised inner edge;

applying an adhesive to the front surface away from the raised inner edge;

stretching a metallized plastic film over the smooth raised inner edge and into securing engagement with the adhesive on the front surface; and heat shrinking the secured metallized plastic film.

5. A mirror for a projection television receiver comprising:

a frame having a front surface;

said frame having a substantially U-shaped cross section with a front wall and a rear wall;

a smooth raised inner edge along said front surface;

a stretched metallized plastic film secured to said front surface and in contact with said smooth raised inner edge;

a rigid backing in close proximity to said metallized plastic film, said rigid backing having edges that are sandwiched between said front wall and said rear wall; and wherein said rear wall includes an outwardly angled guide lip for facilitating the installation of said rigid backing.

6. The mirror of claim 5, further including a plurality of support brackets affixed to said frame.

7. The mirror of claim 6, wherein said frame is formed from roll stock aluminum that is cut and bent into the desired shape.

8. A mirror for a projection television receiver comprising:

a U-shaped frame having a front surface including a smooth raised edge defining an inner area;

a stretched metallized plastic film adhesively secured to said front surface of said frame in contact with said smooth raised edge;

a rigid backing in close proximity to said metallized plastic film, said backing having edges that are sandwiched between the walls of said U-shaped frame; and wherein said frame is formed from cut and bent roll stock aluminum and wherein the rear of said frame includes an outwardly angled guide lip for facilitating installation of said rigid backing, and further including a plurality of support brackets affixed to said frame.

* * * * *